Figure 9:
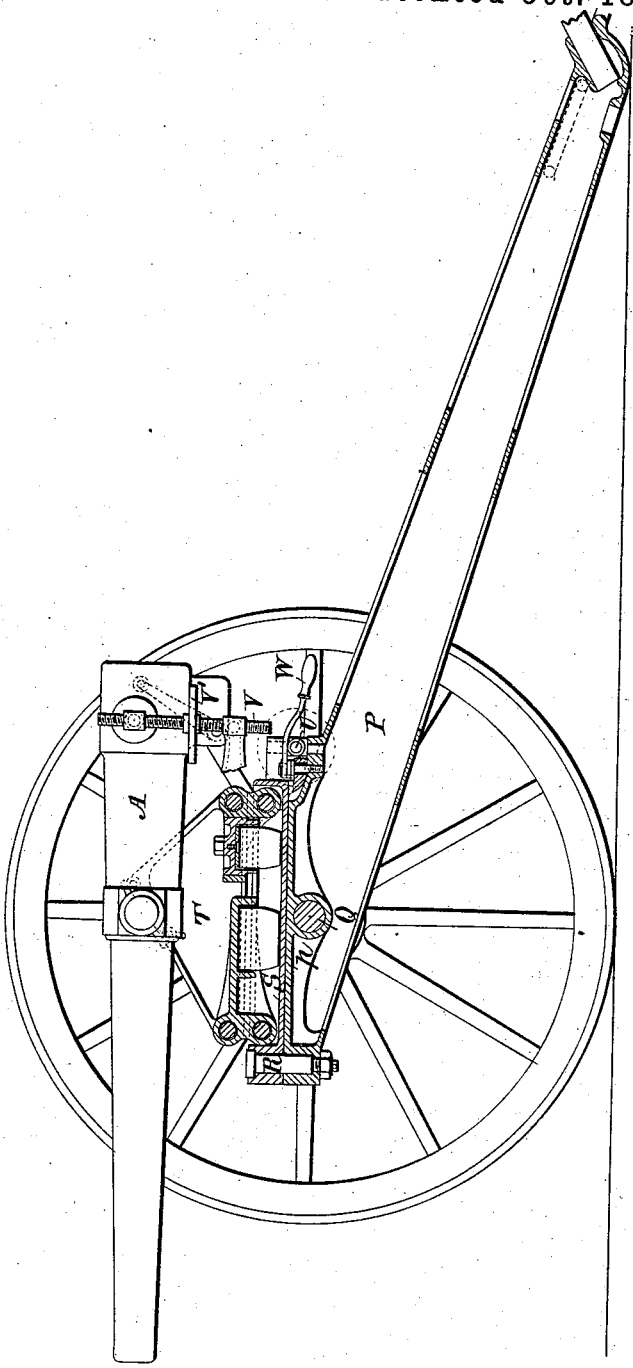

(No Model.) 7 Sheets—Sheet 1.
W. GARDNER.
BREECH LOADING GUN.
No. 371,836. Patented Oct. 18, 1887.
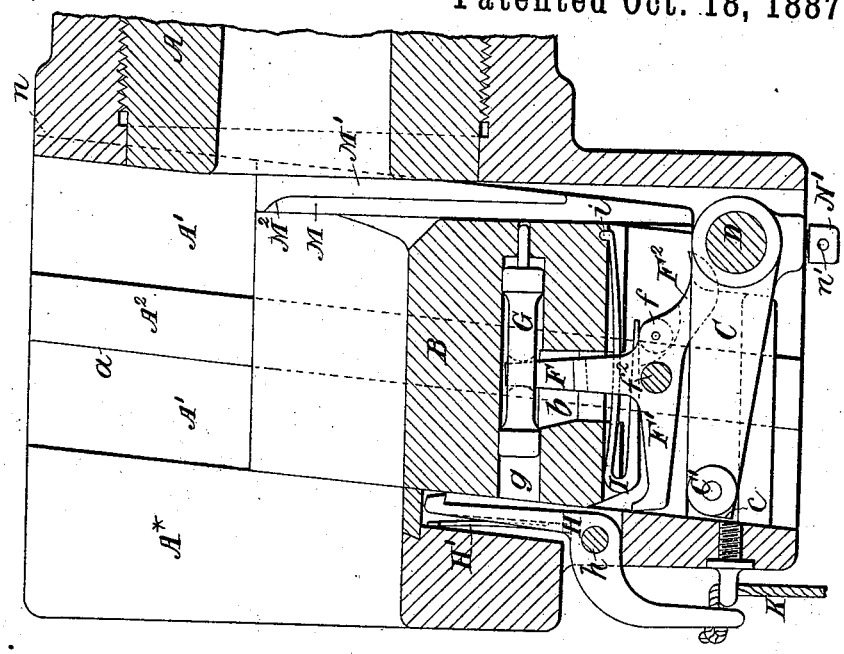
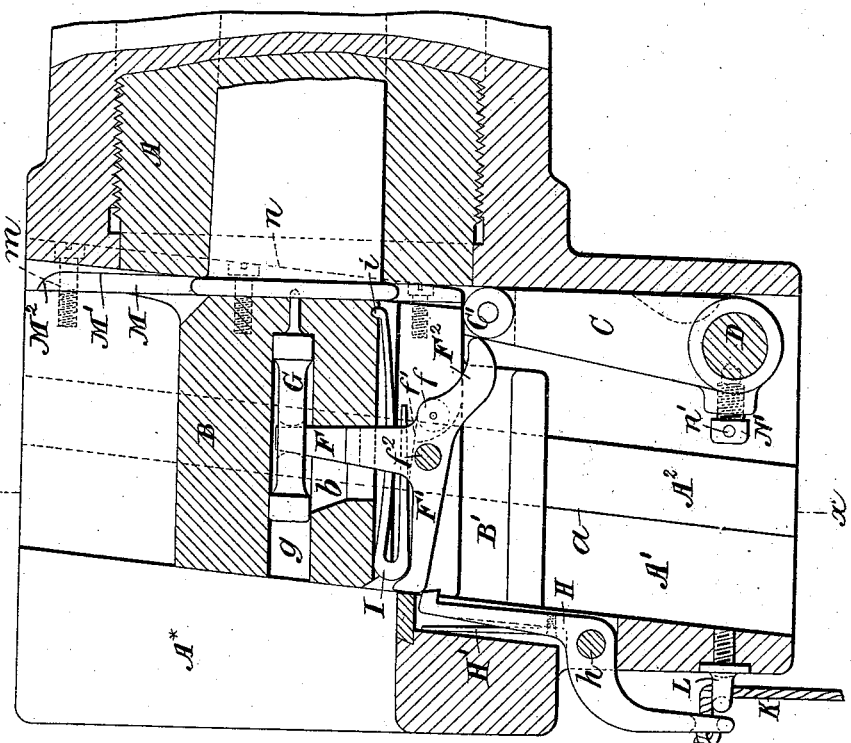
Witnesses.
Percy B. Hills.
Robert Emmett.
Inventor.
William Gardner.
By James L. Norris.
Atty.
N. PETERS. Photo-Lithographer, Washington, D. C.

(No Model.)  7 Sheets—Sheet 2.
W. GARDNER.
BREECH LOADING GUN.
No. 371,836.  Patented Oct. 18, 1887.
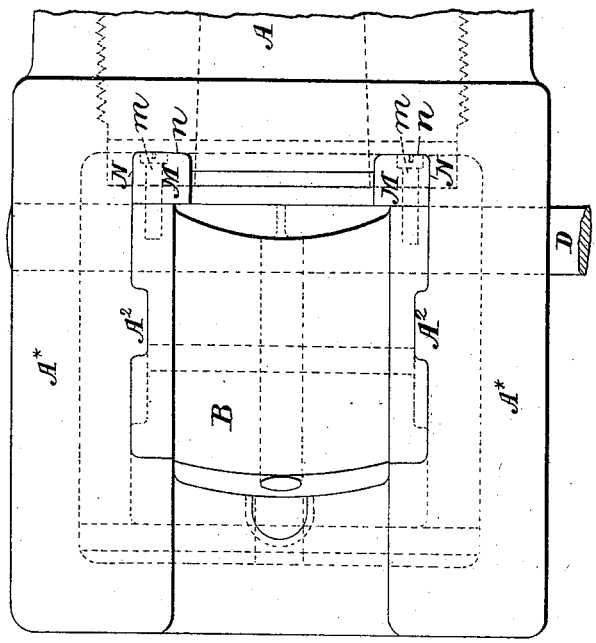
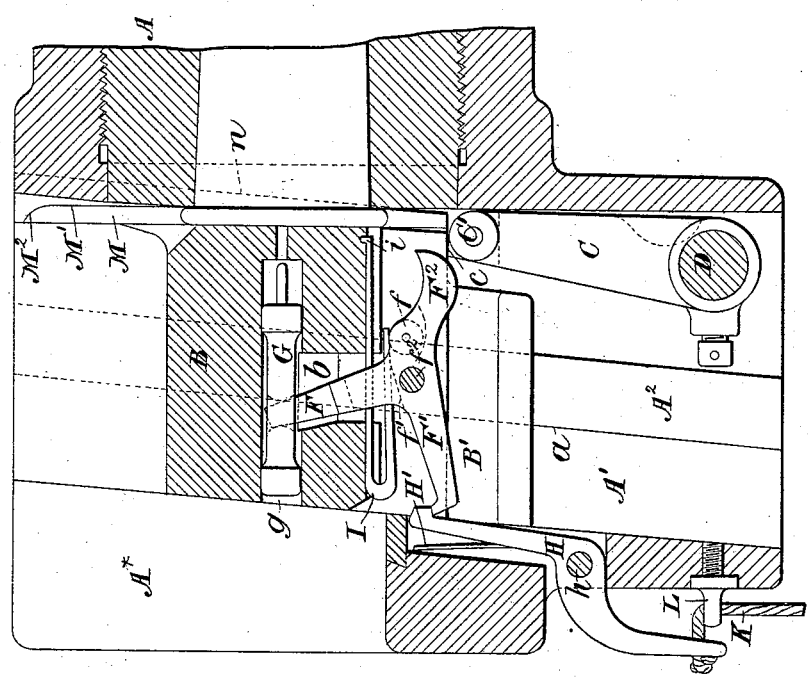
Witnesses.
Percy B. Hills
Robert Everett
Inventor.
William Gardner
By James L. Norris.
Atty.

(No Model.)
7 Sheets—Sheet 3.
W. GARDNER.
BREECH LOADING GUN.
No. 371,836. Patented Oct. 18, 1887.
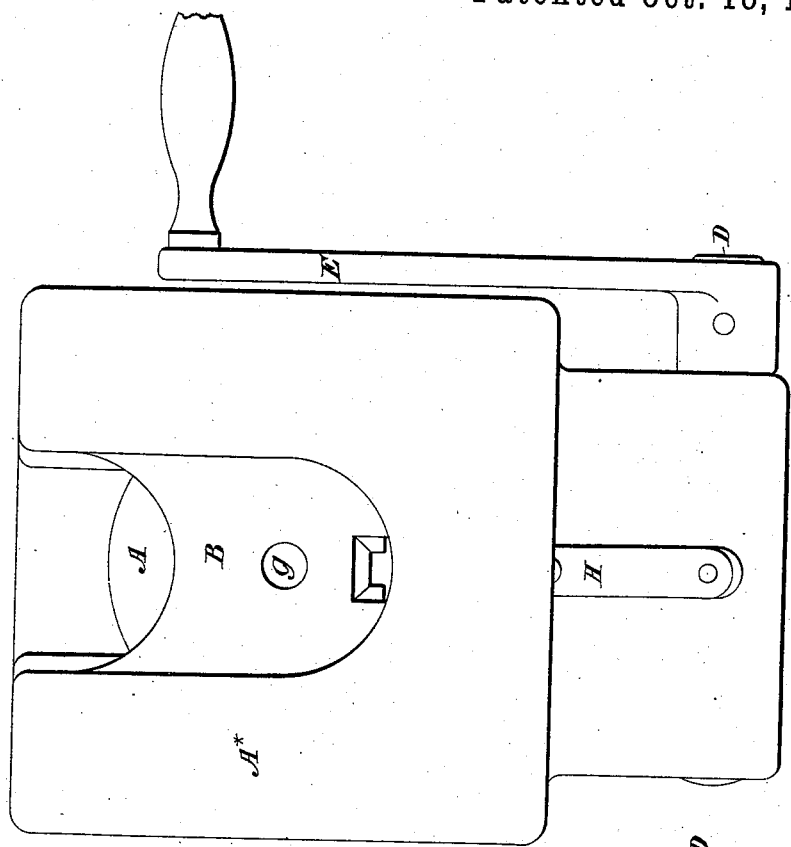
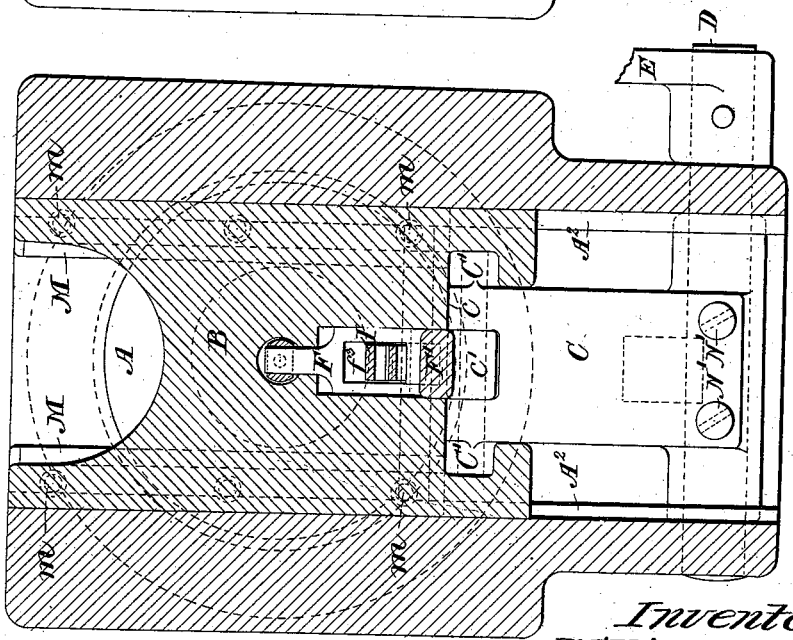
Witnesses:
Percy B. Steele.
Robert Barrett,
Inventor:
William Gardner,
By James L. Norris.
Atty.
N. PETERS, Photo-Lithographer, Washington, D. C.

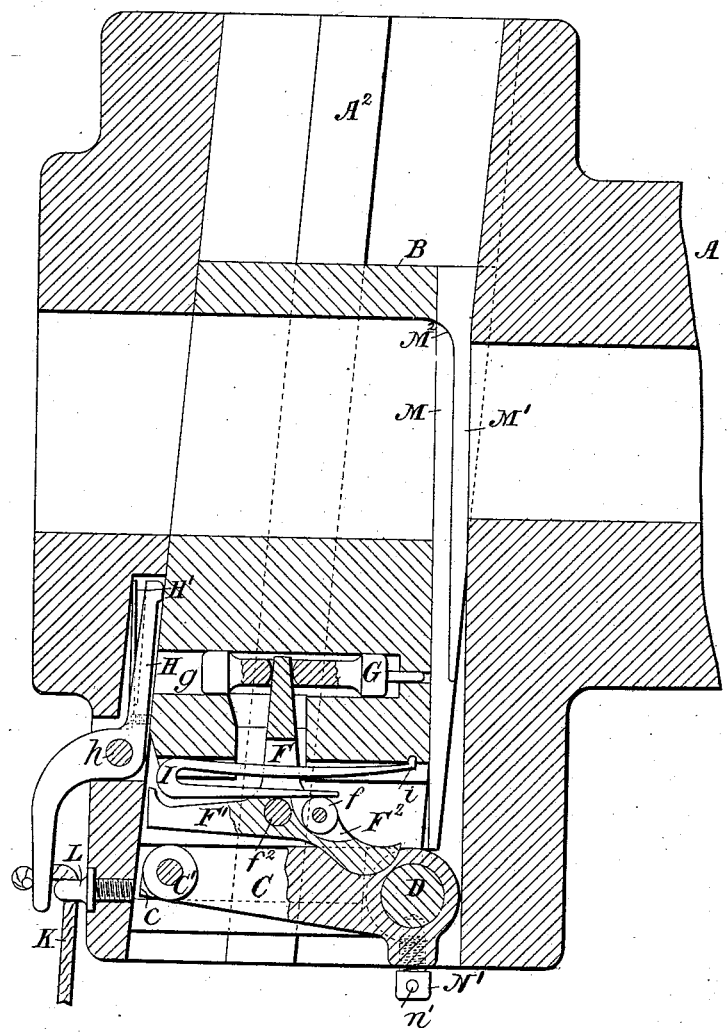

(No Model.) 7 Sheets—Sheet 5.
W. GARDNER.
BREECH LOADING GUN.
No. 371,836. Patented Oct. 18, 1887.
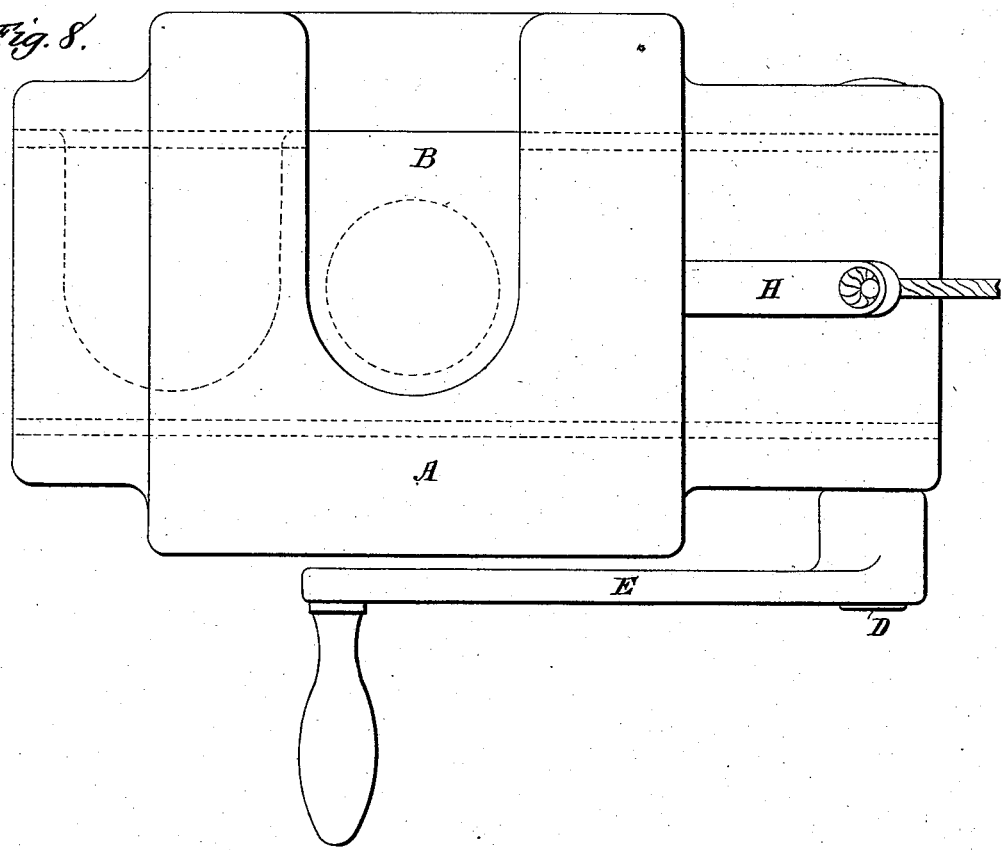
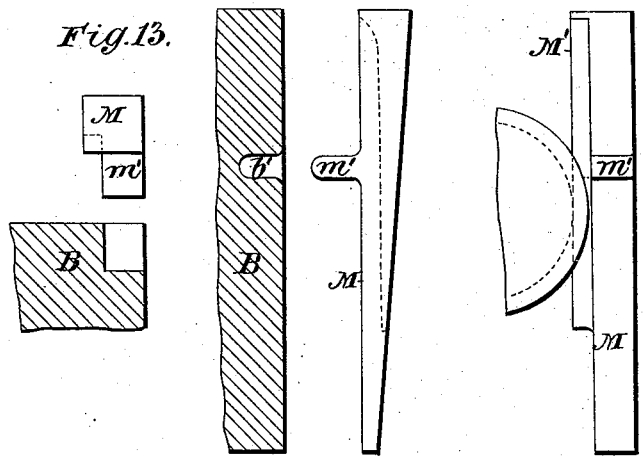

(No Model.)  W. GARDNER.  7 Sheets—Sheet 6.
BREECH LOADING GUN.

No. 371,836. Patented Oct. 18, 1887.

Witnesses.
Percy B. Hills
Robert Everett

Inventor.
William Gardner
By James L. Norris
Atty.

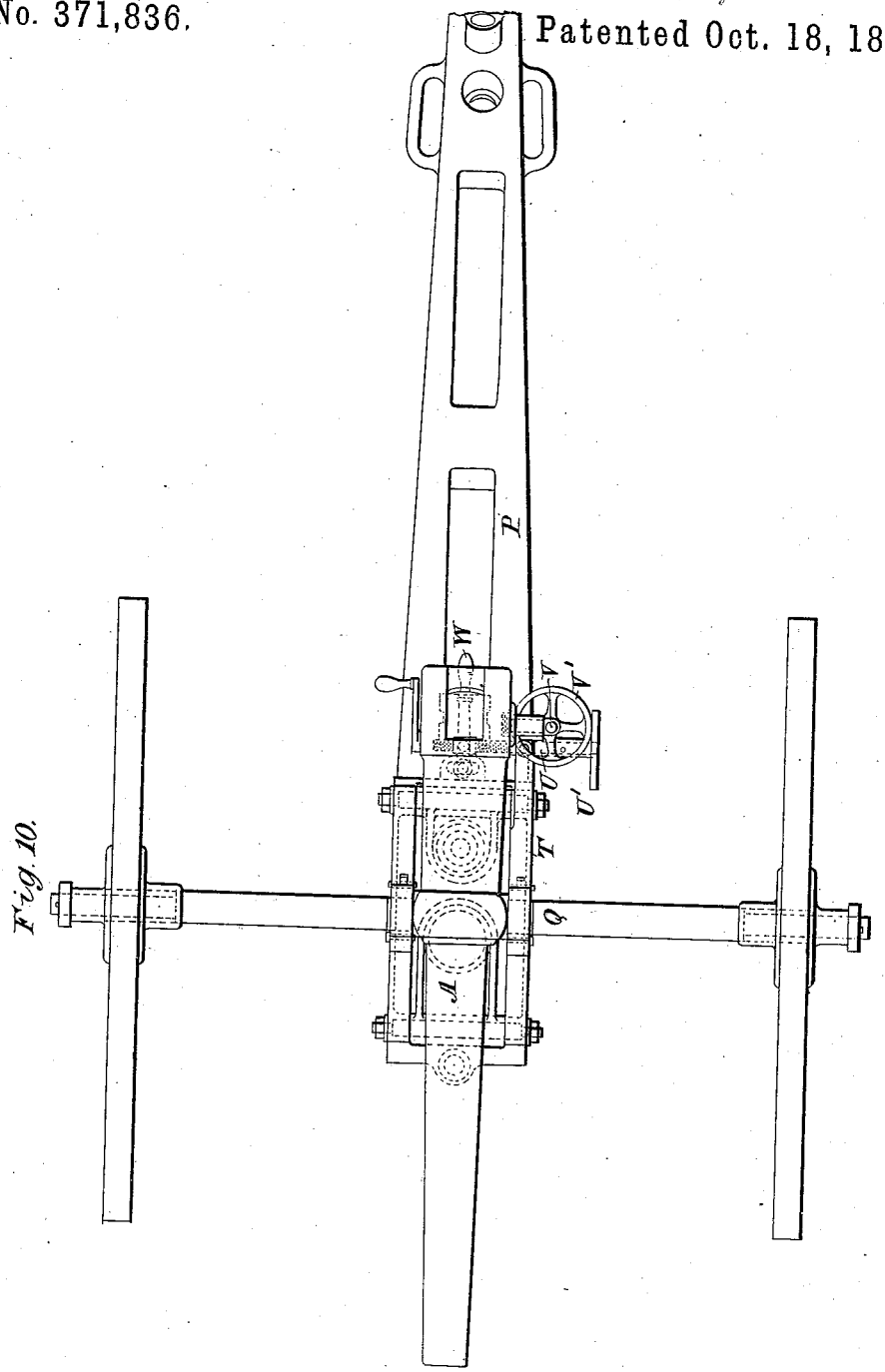

UNITED STATES PATENT OFFICE.

WILLIAM GARDNER, OF CURTAIN ROAD, COUNTY OF MIDDLESEX, ASSIGNOR TO RICHARD COPLEY CHRISTIE, OF GLENWOOD, ENGLAND.

BREECH-LOADING GUN.

SPECIFICATION forming part of Letters Patent No. 371,836, dated October 18, 1887.

Application filed January 27, 1887. Serial No. 225,731. (No model.) Patented in France March 11, 1884, No. 160,868; in Germany March 15, 1884, No. 29,398; in England March 18, 1884, No. 5,087; in Belgium March 31, 1884, No. 64,507; in Italy April 4, 1884, XVIII, 16,616, and XVIII, 76; in Austria-Hungary April 30, 1884, No. 10,246, and in Spain August 8, 1884, No. 6,021.

*To all whom it may concern:*

Be it known that I, WILLIAM GARDNER, engineer, a citizen of the United States of America, and residing at 49 Curtain Road, in the county of Middlesex, England, have invented certain new and useful Improvements in and Relating to Breech-Loading Guns, (for which I have obtained patents in Great Britain, No. 5,087, dated March 18, 1884; in France, No. 160,868, dated March 11, 1884; in Belgium, No. 64,507, dated March 31, 1884; in Germany, No. 29,398, dated March 15, 1884; in Austria-Hungary, No. 10,246, dated April 30, 1884; in Italy, Vol. 18, No. 16,616, Reg. Gen., Vol. 18, No. 76, Reg. Att., dated April 4, 1884, and in Spain, No. 6,021, dated August 8, 1884,) of which the following is a specification.

My invention relates to breech-loading ordnance and fire-arms of that class in which a sliding breech-block is arranged to be actuated by means of a lever and crank to open and close the breech.

My said invention has for its object to improve the construction of the breech mechanism, and thereby increase the rapidity with which the gun can be loaded and fired; and my said invention comprises improved means for extracting and ejecting the empty cartridge-cases.

In carrying my invention into practice I provide the hammer with two arms or extensions and arrange the same in the breech-block in such a manner that one of the said arms or extensions will project into the path of the crank, whereby the hammer will be cocked when the breech is opened or closed. The sear is so arranged that it will engage with the other arm or extension of the hammer when the breech is closed by the breech-block. This sear is either made to serve also as a trigger, as hereinafter described, or it is arranged in any suitable manner to be acted upon by a trigger. I employ, by preference, two extractors; but one of the same is in some cases dispensed with. Each extractor is arranged in front of the breech-block with which it is connected in such a manner that it will slide up and down or to and fro therewith, and each extractor is formed with a projection or flange which lies in front of the flange of a cartridge when the latter is inserted in the barrel. I make the breech-block to slide in a direction slightly more oblique than is usually the case in guns of this class as heretofore constructed, so that the act of opening the breech will cause the extractor or extractors to withdraw the empty cartridge-case from the barrel, and the rear side of each of the said projections or flanges is inclined or curved rearwardly at its upper end, so that after the cartridge-case has been withdrawn slightly from the barrel it will be moved backward with accelerating speed and ultimately be thrown out of the breech of the gun. Moreover, I so construct the several parts of my improved gun that it can be readily dismounted by the aid of a metal rod or an ordinary nail of suitable size—that is to say, without the use of special tools, such as screw-drivers or spanners, which might be lost or might not be obtainable when required. I sometimes mount a cannon constructed according to my present invention upon a gun-carriage similar to those described in the specification of my British Letters Patent dated August 30, 1883, No. 4,188.

In the accompanying drawings I have shown how my said invention may be conveniently and advantageously applied to a cannon designed for use with metallic cartridges, or what is termed "fixed ammunition."

Figure 1 is a central longitudinal section of the breech end of the said cannon, showing the parts in the position which they occupy immediately after the discharge. Fig. 2 is a similar view with the breech opened. Fig. 3 is a similar view showing the parts in the position which they occupy when the cannon is ready for firing. Fig. 4 is a plan or top view of the parts shown in Figs. 1, 2, and 3. Fig. 5 is an end elevation of the same. Fig. 6 is a transverse section on the line $x\,x$, Fig. 1, showing the hammer in its cocked position. Fig. 7 is a central horizontal section, and Fig. 8 an end elevation, showing a modified form of my improved cannon. Fig. 9 is a side elevation, partly in longitudinal section, showing my improved cannon mounted on a gun-carriage constructed according to my said former specification. Fig. 10 is a plan of the same. Fig. 11 is a side elevation. Fig. 12 is a rear elevation, and Fig. 13 a plan, partly in horizontal section, showing one mode of connecting the aforesaid extractor or extractors to the breech-block.

Like letters indicate the same parts throughout the drawings.

A is the barrel, and B the breech-block, which in the cannon shown in Figs. 1 to 6 is capable of sliding up and down in the breech chamber or aperture A' in the breech A* and is guided by the ribs or projections $A^2$, which enter corresponding grooves in the breech-block. The front side of the breech-block is made to form a right angle with the axis of the barrel, so as to fit closely against the base of the cartridge when the latter is inserted in the barrel. The rear side of the said breech-block and the aforesaid ribs and grooves are slightly inclined in such a direction that the breech-block as it moves downward will, at the same time, move backward or away from the end of the barrel, and as it moves upward will be wedged tightly against the base of a cartridge inserted in the said barrel.

C is a crank fixed on the shaft D, on which is also fixed the lever E, for partially rotating the said crank in either direction. The crank C is made with a flat end, c, which bears against the under side of the breech-block B when the latter is closed, as shown in Fig. 3. The crank-pins C' are arranged to fit into slots B' in the lower part of the breech-block for the purpose of opening and closing the breech.

F is the hammer for operating the firing-pin G, which passes through the breech-block. The hammer F is pivoted to the breech-block at $f^2$, and is made with two extensions or arms, F' $F^2$. The said hammer extends through a slot, b, in the breech-block into an aperture or slot in the firing-pin G, as shown. The arm F' of the said hammer is adapted to engage with the sear H, and the arm $F^2$ is suitably curved and projects into the path of the crank C, so that the latter will cock the hammer by the same movement that opens or closes the breech, and to prevent or diminish friction upon the arm $F^2$ the crank C is provided with a roller, c'.

A spring, I, is fixed to the breech-block, and when the hammer is cocked bears upon an anti-friction roller, f, carried by the arm $F^2$ of the hammer. The said hammer is made with a flat portion, f', so arranged, in combination with the spring I, that after the gun is fired the hammer will be forced by the said spring into the position shown in Fig. 2, thereby withdrawing the firing-pin from the cartridge-case and holding it in this position to permit the descent of the breech-block.

The sear H is a lever pivoted at h to the breech A* in such a manner that it will serve also as a trigger. A cord, K, is attached to the lower end of the sear H, and is passed through an eye, L, screwed into the breech A*. By pulling the said cord the gun can be easily fired. The sear H is acted upon by a spring, H', which tends to hold it in the path of or in engagement with the arm F' of the hammer. The upper end of the said sear must be made of sufficient width to prevent its entering the aperture or passage g, in which the firing-pin is situated.

Two extractors, M, are employed in the cannon shown in Figs. 1 to 6. Each of these extractors consists of a wedge-shaped piece of steel or other suitable material secured to the breech-block B in such a manner that it will move up and down therewith. When the breech-block is moved up or down, these extractors or wedge-shaped pieces slide in grooves N in the breech end of the barrel, the bottom faces, n, of which grooves are longitudinally parallel to the rear surface of the breech-block. Each of the said wedge-shaped pieces has a flange or projection, M', which lies in front of the flange of a cartridge inserted in the barrel and forms part of the seating for the said flange. The rear sides of these projections or flanges are parallel to the front face of the breech-block, so that as the latter descends the said projections exert a wedge-like action upon the cartridge-case, and thereby force the same from the barrel, and the said projections are made with inclined or curved surfaces, $M^2$, which will come in contact with the flange of the said cartridge-case when the breech-block has descended far enough to permit the ejection of the same, and will so act thereon as to throw it out of the breech of the gun.

The extractors M are shown in Figs. 1, 4, and 6 fixed to the breech-block by means of screws m; but I prefer to dispense with the said screws and make each extractor, as shown in Figs. 11, 12, and 13, with a projecting piece or rib, m', which enters a recess or cavity, b', in the breech-block. By these means the said extractor is caused to move up and down with the breech-block, but can be readily removed therefrom when the latter is withdrawn from the breech A*. If desired, the said screws may be employed in addition to the rib m'.

It is obvious that if the extractors are firmly fixed by screws to the breech-block the latter will, when a cartridge is being extracted, bear against the sides a of the ribs $A^2$; but if the said screws are dispensed with and the extractors are connected with the breech-block, as shown in Figs. 11, 12, and 13, they will, when a cartridge is being extracted, bear against the bottom faces, n, of the grooves in which they are fitted. In each case, however, the said extractors will move backward from the barrel and will act like wedges driven or forced between the flange of the cartridge-case and the breech end of the barrel.

In Figs. 7 and 8 I have shown a modified form of my improved cannon, in which the breech-block B is arranged to be moved to and fro horizontally and transversely to the axes of the barrel to open and close the breech. The construction and arrangement of the parts are substantially similar to those above described; but only one extractor can be employed.

In order that the gun may be easily dismounted without the use of special tools, I connect the various parts of the breech mechanism as follows—that is to say, the crank C is fixed to the shaft D by screws N', having holes n', for the reception of a steel or other rod or a nail or similar article for the purpose of slackening the said screws and permitting the removal of the shaft D and crank C from the gun. The hammer F is pivoted upon a pin or rod, $f^2$, which extends from side to side of the breech-block B, and which is held in place by the ribs $A^2$, but can be easily removed when the breech-block is withdrawn from the breech chamber or aperture A'. The spring I is passed through a slot, $f^3$, in the hammer F, so that it is prevented from moving laterally, and the said spring is provided with a projection, $i$, which enters a recess or cavity in the breech-block and prevents longitudinal movement of the said spring.

In Figs. 9 and 10 I have shown my improved cannon combined with a gun-carriage embodying the improvements described in my said former specification.

My invention may, if desired, be applied to a rifle or other small-arm, and in this case the sear is preferably arranged to be acted upon by an ordinary trigger.

What I claim is—

1. The combination, with the barrel and breech of a breech-loading gun, of a breech-block, B, sliding transversely to the axis of the barrel, a firing-pin, G, moving in the breech-block, a hammer, F, pivoted to the said block and engaging the firing-pin and provided with the rearward and forward projecting arms F' and $F^2$, the pivoted sear H, for engaging the rearward-projecting arm when the breech-block is slid inward to cover the breech-opening, the rock-shaft D, and the swinging crank-arm C, mounted on said shaft and engaging the breech block to open and close the same and moving in the path of the forward-projecting arm of the hammer to cock the latter when the crank is swung to open or close the breech, substantially as described.

2. The combination, with the barrel and breech of a breech-loading gun, of a breech-block, B, sliding transversely to the axis of the barrel and having slots B' at one end, a firing-pin, G, moving in the breech-block, a hammer, F, pivoted to the said block and engaging the firing-pin, and provided with the rearward and forward projecting arms F' and $F^2$, the pivoted sear H, for engaging the rearward-projecting arm when the breech-block is slid inward to cover the breech-opening, the rock-shaft D, having a lever, E, and a swinging crank, C, mounted on said shaft and having crank-pins C', engaging the slots in the breech-block to open and close the latter, said crank moving in the part of the forward-projecting arm of the hammer to cock the latter when the crank is swung to open or close the breech, substantially as described.

3. The combination, with the barrel and breech of a breech-loading gun, of a breech-block, B, sliding transversely to the axis of the barrel and moving rearward when operated to unclose the breech, a wedge-shaped extractor, M, secured to and moving with the breech-block, a firing-pin, G, moving longitudinally in the said block, a hammer, F, pivoted to the block and engaging the firing-pin and having the rearward and forward projecting arms F' and $F^2$, the pivoted sear H, for engaging the rearward-projecting arm when the breech-block is slid inward to cover the breech-opening, the rock-shaft D, having a handle, E, and the swinging crank C, mounted on the shaft and engaging the breech-block to open and close the same and moving in the path of the forward-projecting arm of the hammer to cock the latter when the crank is swung to open or close the breech, substantially as described.

4. The combination, with the barrel and breech of a breech-loading gun, of a breech-block, B, a firing-pin, G, sliding longitudinally in said block, a hammer, F, pivoted to the breech-block and extending into the same and engaging the firing-pin and provided with the rearward and forward projecting arms F' and $F^2$, a sear, H, for engaging the rearward-projecting arm, and a lever and crank for opening and closing the breech and acting on the forward-projecting arms of the hammer to cock the latter as the crank is moved to open or close the breech, substantially as described.

5. The combination, with the barrel and breech of a breech-loading gun, of a breech-block sliding transversely to the axis of the barrel and moving backward when operated to open the breech, and a wedge-shaped extractor, M, secured to and moving with said breech-block and exerting a wedging action on the cartridge-case when moved by the breech-block in opening the breech, substantially as described.

6. The combination, with the barrel and breech having the groove N n, of a breech-block sliding transversely to the axis of the barrel and moving rearward when operated to open the breech, and an extractor, M, secured to the breech-block and having the flange M', the rear side of which is parallel to the front face of the breech-block and engages said groove and is provided at its free end with the inclined surface $M^2$, for throwing the cartridge-case out of the breech of the gun, substantially as described.

7. In a breech-loading gun, an extractor, M, fitted to slide in a groove in the breech end of the barrel and connected with the breech-block by means of ribs or projections m', fitting into recesses or cavities in the breech-block, substantially as and for the purposes set forth.

8. The combination, with the barrel and breech of a breech-loading fire-arm, of the sliding breech-block B, having the slots B' at one end, the crank C, provided with the crank-pins C', engaging said slots, and having the roller c', the shaft D, the handle E, and the screw N', detachably securing the crank to said shaft, substantially as described.

In testimony whereof I have hereunto signed my name in the presence of two subscribing witnesses.

WILLIAM GARDNER.

Witnesses:
  CHAS. MILLS,
    47 *Lincoln's Inn Fields, London.*
  FRED GOODWIN,
    *Solicitor, Hastings.*